Patented Feb. 2, 1926.

1,571,626

UNITED STATES PATENT OFFICE.

HENRY V. DUNHAM, OF MOUNT VERNON, NEW YORK, ASSIGNOR TO THE ROSEMARY CREAMERY COMPANY, OF NEW YORK, N. Y., A CORPORATION OF NEW YORK.

PROCESS OF OBTAINING MILK SUGAR.

No Drawing. Application filed January 30, 1923. Serial No. 615,951.

*To all whom it may concern:*

Be it known that I, HENRY V. DUNHAM, a citizen of the United States, residing at Mount Vernon, in the county of Westchester and State of New York, have invented certain new and useful Improvements in Processes of Obtaining Milk Sugar, of which the following is a specification.

In the concentration of whey for the commercial manufacture of milk sugar, vacuum pans have usually heretofore been employed. In my copending case No. 363,751, (Patent 1,443,528, January 30, 1923) I make claim for the concentration of whey in an open pan divided into compartments by upstanding baffles, thus producing a continuous flow of whey through the compartments of the pan, the concentrated whey flowing out continuously at the other end of the pan. While this method produces a good sugar, I find that in some cases it is desirable to hold the whey in the concentrating pan at or near the boiling point for a considerably longer time than is necessary to concentrate any given portion of the whey. This long continued heating has a desirable effect upon the condition of the albumen in the partially concentrated whey and allows of its settling out more quickly and easily. Whey usually contains about ¾ to 1% of lactalbumen. About 90 to 95% of this is coagulated by heat when the whey is heated to about 185 to 190° F. The remaining 5 to 10% of the albumen is not thrown out by heat until the whey reaches a considerable concentration and even then small amounts remain in the finished crude sugar. When whey is concentrated in a vacuum the lactalbumen is gradually thrown out as the concentration continues but not in so great quantities or so completely as is the case when evaporating under atmospheric pressure while blowing the surface of the boiling liquid, by a current of air. This is no doubt due to the fact that at any given concentration, the whey is not so hot (when being concentrated in vacuum) as is the case when evaporating under atmospheric pressure. The precipitation is also more complete when the whey is heated for a rather long continued period of time. By the latter method the albumen is more compact and in a different physical condition, which allows of its removal from the partially concentrated whey with greater ease. In order that my invention may be more clearly understood, I give herewith an example.

A pan of the same shape and type as described in my copending case may be used and the same method followed except that an opening be made by means of a sliding door in each baffle and the outlet at the finishing end of the pan closed. The doors are opened in the compartments and the raw whey run in while heat is applied to the bottom of the pan. As the concentration of the whey proceeds more whey is allowed to flow into the pan and the evaporation continued. In this way suppose the pan held 500 pounds of raw whey, as it condenses, an automatic float allows more whey to flow in but the outlet of the pan is closed. The result is that the whey continues to become richer in sugar and continues to boil until the capacity of the pan has been reached at a certain Baumé concentration. When this point has been reached which is about 20° B., measured at 190° F., the heavy syrup containing the albumen mentioned above is removed from the pan, allowed to settle and the clear top layer of syrup is again run into the pan and concentrated to the point of crystallization about 35 to 38° B., measured at 190° F. Any other type of pan may be used, the main point being that a good supply of air be allowed to strike the foaming surface as in my other case. By the above described method I get a crude sugar of large crystals containing a minimum amount of albumen and which allows of washing and refining with minimum losses, this being due to the fact that the albumen has this long continued heating which it would not get if the whey or syrup were allowed to simply flow through the compartments as in my other case and as soon as concentrated be removed.

It will be understood that this process can be carried out in a pan not provided with baffles, so long as a good blast of air is provided blowing downwardly on the surface of the whey, in order to prevent excessive foaming. It will be understood that I do not aim to entirely prevent foaming of the liquid, which can only be prevented by maintaining a very low temperature, but the air blast should be sufficient to prevent the whey from foaming over on to the outside of the pan or kettle in which the same is being evaporated.

An important feature of the present process resides in the fact that the liquid whey is boiled until it has reached a concentration of 20° Bé., measured at 190° F., at which time substantially the whole of the albumen has been precipitated, which precipitated albumen is then in such a physical condition that it can then be separated from the clear liquid in any suitable manner, for instance, by filtration, settling, centrifugal separation or otherwise, and the liquid whey can then be further concentrated to a higher gravity say 35 to 38° B., at 190° F., either in the same pan or in any other kind of a pan, after which the liquid is drawn out and the milk sugar crystallized therefrom. I believe that it is the long boiling at high temperature, which causes the albumen of the whey to be fully precipitated.

I claim:

1. A process which comprises boiling whey at atmospheric pressure, by direct fire heat, while preventing excessive foaming by blowing currents of air against the surface of the boiling liquid, continuing the heating of the whey at atmospheric pressure until the whey has reached a concentration of at least 20° Bé., measured at 190° F., whereby the bulk of the albumen of the whey has been precipitated and has assumed a readily filterable condition, separating such precipitated albumen from the whey and thereafter further concentrating the whey by boiling the same at atmospheric pressure.

2. A process of producing milk sugar which comprises concentrating a bulk of whey at atmospheric pressure while blowing the surface thereof sufficiently to prevent excessive foaming, successively introducing further amounts of whey thereinto while maintaining the liquor at near its boiling point for a long period, until the bulk of the albumen has been converted into a coarse coagulum, and until the liquor has a gravity of at least 20° Bé., measured at 190° F., separating the coagulated albumen and the liquor from each other and further concentrating to crystallization.

In testimony whereof I affix my signature.

HENRY V. DUNHAM.